United States Patent Office 3,190,941
Patented June 22, 1965

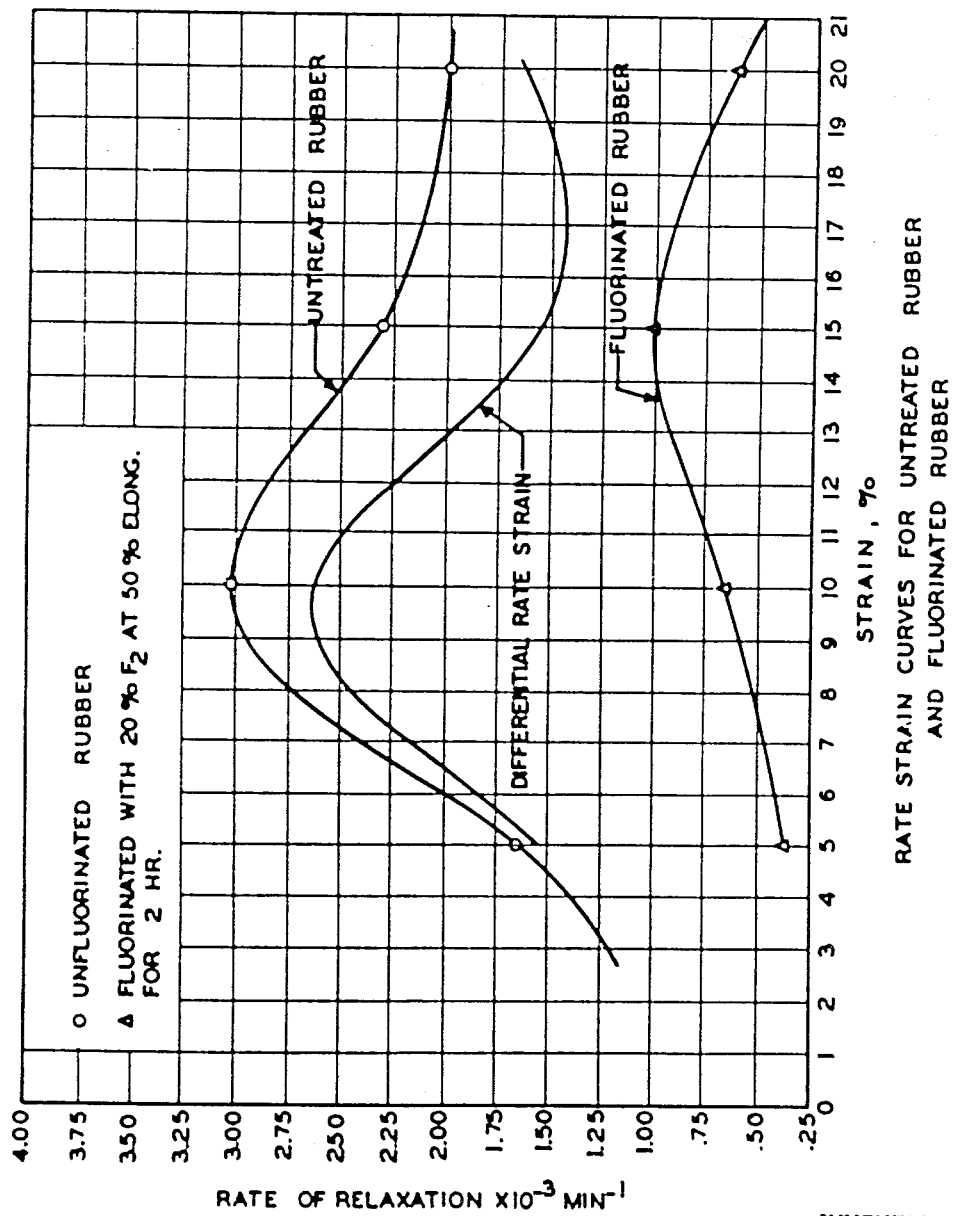

3,190,941
OZONE-RESISTANT RUBBER
Frederick R. Balcar, Millington, William G. Marancik, Basking Ridge, and Robert J. Hodges, Newark, N.J., assignors to Air Reduction Company Incorporated, New York, N.Y., a corporation of New York
Filed Feb. 17, 1961, Ser. No. 90,014
4 Claims. (Cl. 260—772)

This invention relates broadly to new elastic compounds containing fluorine, and to a method of making the same. More specifically, it relates to an improved method for treating rubber with fluorine to obtain elastic compounds having improved chemical and physical properties. The term rubber as used herein shall be construed to include natural rubber, substitutes for rubber, and synthetic rubber-like compounds.

It has been known for many years that certain substances have deleterious effects on rubber, causing cracks to appear on the surface. Depending on existing conditions, these cracks may penetrate deeply into the body of the rubber and cause mechanical failure of the rubber article. Substances which attack rubber are principally lubricants, moisture, and oxidizing substances, such as ozone and oxygen.

Rubber is attacked rapidly by ozone and more slowly by oxygen, causing polymer degradation; this reaction is accelerated by light, but it proceeds even in the dark. It is remarkable that even the small concentrations of ozone in the atmosphere, from 1 to 90 parts per hundred million, are known to be responsible for the appearance of cracks in rubber over a long period of time. Ozone is generated in many ways. It is generated in an oxygen-containing atmosphere by high energy radiation, such as electrical discharge and atomic radiation. In the ozone layer above the tropopause, which lies between 50,000 and 100,000 feet above the surface of the earth, ozone is generated by the action of the strong ultra-violet portion of sunlight on oxygen. Thunderstorms, auroras, cosmic rays, and other forces of nature also produce ozone in the atmosphere.

The general distribution of ozone through the atmosphere and the detrimental effect of ozone on rubber are important factors in controlling the useful life of rubber articles in storage, in use on the earth, or in airborne vehicles. Examples of such articles are tires, breathing equipment, fluid conduit, gasket material, electrical insulation, and meteorological balloons. The various rubber parts of high altitude aircraft which are capable of operating in the stratosphere near the ozone layer are especially subject to ozone attack.

The exact manner in which ozone reacts with rubber is not fully understood. In the case of natural rubber, it is generally believed that the rubber molecule is attacked by ozone at the double bonds. In the first instance an unstable ozonide is formed; the ozonide then decomposes spontaneously, leading to chain scission. These steps may be expressed by the following equations:

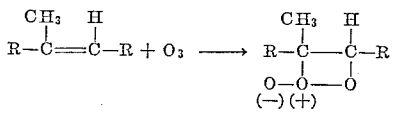

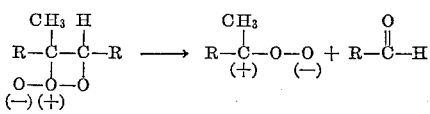

Cracks will then form in strained rubber leading finally to complete physical failure of the article.

The rubber industry has long sought a method of preventing degration of rubber by ozone, but despite extensive military and civilian programs, a solution has not yet been found. Some attempts have been made heretofore to manufacture rubber articles which are resistant to the deleterious substances referred to above, with varying degrees of success. A surface coating of wax has been found to be effective if the rubber is not strained, but as soon as the coated rubber is strained, cracks immediately begin to form. Another approach employs the use of certain organic compounds known as antioxidants and antiozonants, which when used in large amounts are found to give some protection to the double bonds, but complete protection has not been effected. Moreover, the limited protection depends on diffusion of the treating material to the rubber surface. Still another approach is to treat rubber with fluorine (U.S. Patent No. 2,129,289) to obtain substitution products containing fluorine; but these products have limited commercial application for example, as insulating electrolytic cells used in the production of fluorine.

It is readily obvious, therefore, that the industry needs a process for treating rubber to obtain a product which does not react with oxidizing substances, such as ozone. Prolonging the life of rubber articles in use and in storage would be of great value for many military applications referred to above. For example, ozone-resistant rubber would be highly desirable for such articles as oxygen masks which are stored for long periods of time, and which must be serviceable when needed.

One object of this invention is to provide an improved method of treating rubber.

Another object of this invention is to provide a rapid and efficient process for producing a rubber which is resistant to oxidizing substances.

Still another object of the invention is to provide a treated rubber article which has substantially the same physical properties as the untreated rubber article, but in addition the treated article is highly resistant to lubricants, moisture, and oxidizing substances and may be stored for considerable periods of time and still be serviceable when needed.

A particular object of the present invention is to provide an improved face mask having a pliable portion adapted to be shaped to a wearer's facial contours, and which mask is readily serviceable even after having been stored for a long period of time.

The invention is based mainly on our discovery that an improved rubber article highly resistant to various deleterious substances can be obtained efficiently and economically by reacting rubber with a gaseous mixture containing predetermined concentrations of fluorine and a neutral gas which is substantially inert with respect to the reactants and product of reaction. The neutral or inert gas may be, for example, argon, helium, nitrogen, or carbon dioxide.

In its more complete aspects, the process of our invention comprises treating rubber samples under stress with a fluorine-containing gaseous mixture, preferably containing at least 20% by volume fluorine and the balance being a gas substantially inert with respect to the reactants and products of reaction, to produce rubber articles with fluorinated surfaces which are resistant to attack by ozone while the articles are either in a stressed or unstressed state.

While the following examples will serve to illustrate the invention more fully, they are not to be construed as limiting the scope of the invention.

EXAMPLES 1–5

The rubber samples employed in all the examples comprised pure, natural gum rubber. All sample strips (1 inch by 6 inches) were die-cut from a single $\frac{1}{16}$ inch thick rubber stock. The samples were held in rubber stressing racks during treatment, and at predetermined strains. Teflon strips $\frac{1}{8}$ inch thick lined the jaws of the stainless steel clamps which held the end of the sample. The lengths of the samples were controlled precisely by turning the nuts on the threaded rods on either side of the rack. Bench marks were placed on the sample with a sharp pencil, using a templet which spaced the marks 4.25 inches apart.

The rubber sample was introduced into an evacuated reaction vessel; a gaseous mixture comprising 20% by volume fluorine and 80% argon was introduced into the vessel; the system was then closed off, and the reaction was allowed to proceed for sixty (60) minutes at room temperature (21° C.), and at substantially atmospheric pressure. The five samples were maintained at different elongations during fluorination so that the effect of sample strain during treatment could be carefully studied. The samples were then all adjusted to 20% elongation and treated with 50 parts per million of ozone in oxygen at 100° F. for 60 minutes in a flow system.

The appearance of the samples immediately after fluorination is of interest—all the samples regardless of extent of strain appeared the same. They were slightly darker in color than the unfluorinated rubber and all had a fine white crystalline surface coating, which was not present on the surface of the unfluorinated rubber. The latter, however, did have a fine film of talc on the surface which was present thereon when the rubber was originally shipped from the supplier.

For simplicity, the details as to extent of elongation during fluorination, elongation of the treated samples during ozonization, and the results observed thereafter have been tabulated below:

Table I

| Sample No. | Fluoro. elong., percent | Ozoniz. elong., percent | Observations |
|---|---|---|---|
| 1 | none | 20 | The samples exhibited large numbers of evenly distributed fine cracks, but cracking was less severe than on control samples. |
| 2 | 10 | 20 | The samples exhibited a good deal of cracking, but still not as severe as the control samples. |
| 3 | 20 | 20 | No cracks were visible to the naked eye. Some fine cracks were visible under 10 diameter magnification when samples were extended to 100% elongation. Control samples revealed the normal cracking patterns. |
| 4 | 20 | 20 | These samples were extended to 100% elongation for 5 minutes after fluorination but before ozonization. The samples revealed regions of cracking which were nearly as bad as the cracking on the control samples. These regions were distributed in a regular pattern as if caused by the checking of the fluorinated rubber surface. |
| 5 | 40 | 20 | The samples revealed no evidence of cracking, but some very slight pitting was visible under 10 diameter magnification. |

The data above revealed that conducting the process with a 20% fluorine concentration in argon for a reaction period of one hour, and employing atmospheric pressures and normal temperatures, rubber articles were produced which satisfactorily resist attack by ozone while the articles are in stressed state, that is, 20% elongation. After such ozonization there were no cracks in the articles which were visible to the naked eye.

EXAMPLES 6–10

In a manner similar to that described for Examples 1 to 5 above, rubber samples were treated with a gaseous mixture comprising 20% fluorine and 80% argon, but during a reaction period of two (2) hours. During the fluorination run, samples were held at 20%, 30%, 40% and 50%. Sample No. 10 was washed with soap and warm water to remove the talc from the surface. The observational results are tabulated below:

Table II

| Sample No. | Fluorin. elong., percent | Ozoniz. elong., percent | Observations |
|---|---|---|---|
| 6 | 20 | 20 | The samples exhibited a few fine cracks which were far fewer in number than in Sample 1 (Table I). The control samples revealed normal cracking. |
| 7 | 20 | 20 | These samples revealed only a few minor scattered cracks. The overall condition was much superior than that of Sample 6. Normal cracking was seen in the control samples. |
| 8 | 30 | 20 | No cracking could be observed even under increased strain and magnification. Some slight pitting in evidence as it was before ozonization. The degree of cracking on the control samples was normal. |
| 9 | 40 | 20 | Absolutely no cracking was observable; and pitting was still present as before ozonization. |
| 10 | 50 | 20 | Again no cracking of any kind could be seen. The pitting was again present as before ozonization. The control samples revealed cracking which was normal. |

The appearance of the samples after fluorination is of interest. All the samples appeared alike except those which were washed just prior to fluorination. The forms had substantially the same appearance as the samples fluorinated in the first run, that is, the slightly darker color, the white crystalline surface, and some pitting of the rubber which was evident only under close inspection with the magnifier. The treated washed samples had practically no white crystalline coating and virtually no pitting, but they did have an overall darker color. All of the samples treated as indicated in the table for a period of two hours exhibited very little or no cracks after they had been ozonated.

FLOURINE CONCENTRATION

To determine the effect of fluorine concentration, rubber samples were treated with either 1% or 5% fluorine for sixty minutes or less, and the treated samples were then ozonated. Cracks appeared on the treated samples, but they were less severe than cracks appearing on ozonated unfluorinated samples of substantially the same composition.

The examples described above indicate that both fluorine concentration and degree of sample strain during fluorination affect the apparent ozone resistance of the rubber; hence it is reasonable to assume that these two variables would also affect the physical properties of the rubber. Tests were conducted on each of the treated samples reported above and on untreated rubber of substantially the same composition, for determinations of tensile stress, hardness, and permanent set. Tensile stress of course is a measure of the force per unit area required to bring workpiece to a given elongation. Tensile stresses were determined for each sample at three different elongations, namely, 100%, 200% and 300%. The determinations are made on an Instron tensile tester in accordance with ASTM Test Method D412–51T. The results of these determinations are tabulated below:

*Table III*

| Sample No. | Fluorin. elong., percent | Fluorin. time with 20 percent F₂ min. | Tensile stress, p.s.i. | | |
|---|---|---|---|---|---|
| | | | 100 percent elong. | 200 percent elong. | 300 percent elong. |
| 1 | 0 | 60 | 93±2 | 146±2 | 198±0 |
| 2 | 10 | 60 | 94±2 | 150±2 | 204±0 |
| 3 | 20 | 60 | 92±2 | 147±1 | 200±0 |
| 4 | ¹20 | 60 | 89±1 | 145±1 | 199±1 |
| 5 | 40 | 60 | 94±1 | 149±1 | 201±1 |
| 6 | 20 | 120 | 105±3 | 163±2 | 237±1 |
| 7 | ²20 | 120 | 100±1 | 155±1 | 209±1 |
| 8 | 30 | 120 | 104±1 | 163±1 | 223±1 |
| 9 | 40 | 120 | 100±3 | 158±5 | 221±6 |
| 10 | 50 | 120 | 99±1 | 159±0 | 217±1 |
| Control Sample | (³) | | 95±1 | 150±2 | 204±2 |

¹ Extended to 100 percent before testing.
² Washed before fluorination.
³ Unfluorinated.

The data in Table III clearly discloses that the tensile stress of untreated rubber is substantially the same as fluorine-treated rubber of the same composition, for all different elongations, i.e., 100%, 200%, 300%.

Hardness determinations were also made on each sample, employing a Shore A–2 durometer. This test determines the actual hardness of the rubber articles. The results are shown below:

*Table IV*

| Sample No. | Fluorin. elong., Percent | Fluorin. time with 20% F₂ min. | Hardness |
|---|---|---|---|
| 1 | 0 | 60 | 54.5±0.3 |
| 2 | 10 | 60 | 54.7±0.2 |
| 3 | 20 | 60 | 54.7±0.2 |
| 4 | ¹20 | 60 | 54.5±0.3 |
| 5 | 40 | 60 | 54.7±0.3 |
| 6 | ²20 | 120 | 58.1±0.1 |
| 7 | 20 | 120 | 57.4±0.4 |
| 8 | 30 | 120 | 58.1±0.3 |
| 9 | 40 | 120 | 58.3±0.2 |
| 10 | 50 | 120 | 59.4±0.2 |
| Control sample | (³) | | 52.2±0.2 |

¹ Extended to 100% before testing.
² Washed before fluorination.
³ Unfluorinated.

The data in Table IV discloses that hardness is more or less independent of the degree of elongation during fluorination; but hardness tends to increase as the fluorinating period increases. It should be noted that since the durometer instrument requires a ¼ inch thick sample, it was necessary to use four of the ¹⁄₁₆ inch thick samples stacked. While this is permissible, it does result in obtaining hardness values which are higher than those obtained by using a single ¼ inch thick sample, since the increased hardness is produced by the greater number of fluorinated surfaces of the rubber. When four samples are stacked, eight fluorinated surfaces are present, each contributing an increase in hardness; in contrast, when a single ¼ inch fluorinated sample is used, only two such surfaces are present.

After the samples referred to in the preceding tables had been fluorinated, it was noted that some permanent set had been imparted to the rubber articles. This permanent set, reported as percent increase from original length of sample, appears in Table V below. Since untreated rubber always exhibits some permanent set when extended beyond its elastic limit, the values reported for permanent set due to fluorination include this natural effect. Accordingly, the values for natural permanent set and for the permanent set due to fluorination are determined under identical conditions except that the samples for the former are not fluorinated.

*Table V*

| Sample No. | Fluorin. elong., percent | Fluorin. time with 20% F₂ min. | Total perm. set, percent | Perm. set of unfluorin. rubber, percent | Perm. set due to fluorin., percent |
|---|---|---|---|---|---|
| 1 | 0 | 60 | 0.55 | 0.00 | 0.55 |
| 2 | 10 | 60 | 1.39 | 0.00 | 1.39 |
| 3 | 20 | 60 | 1.85 | 0.09 | 1.76 |
| 5 | 40 | 60 | 2.78 | 0.18 | 2.60 |
| 6 | 20 | 120 | 0.92 | 0.09 | 0.83 |
| 7 | ¹20 | 120 | 1.29 | 0.09 | 1.20 |
| 8 | 30 | 120 | 1.66 | 0.19 | 1.47 |
| 9 | 40 | 120 | 1.84 | 0.32 | 1.52 |
| 10 | 50 | 120 | 2.67 | 0.46 | 2.21 |

¹ Washed before fluorination.

The data tabulated above discloses that the amount of permanent set is directly proportional to the amount of elongation, whether the rubber sample be treated or untreated. It will be noted that within the range of 0% and 50% elongation of the sample, permanent set of untreated rubber varies from 0.00% to 0.46%, while the permanent set of fluorinated rubber ranges from 0.55% to 2.21%. Moreover, under the same conditions, the permanent set of rubber previously treated with 20% fluorine for a period of two hours is less than that of rubber treated with 20% fluorine for a period of one hour; in other words, the amount of permanent set appears to be inversely proportional to the length of fluorinating treatment.

Since the desired rubber article must among other things be highly resistant to ozone, tests were conducted to assess the effect of ozone on both untreated rubber and rubber treated in accordance with the process of this invention. Stress relaxation determinations at constant elongations were made on untreated rubber and a particular fluorinated rubber, Sample No. 10. Runs are made at room temperature with an ozone concentration of 20 parts per million of oxygen. Specific details of the method and apparatus for stress relaxation measurements are found in Transactions, I.R.I., Stress Relaxation Method of Measuring Ozone Cracking in Rubber, H. A. Vodden and M. A. A. Wilson, pages 82 to 94, inclusive. The stress relaxation method provides quantitative evaluation of ozone resistance and the effect of varying ozone concentrations. Stress relaxation data are also useful in the interpretation of results and in postulating reaction mechanisms. In the stress relaxation method, rubber samples are held at constant elongation while subjected to an ozone-containing atmosphere. The load required to keep the sample at constant elongation varies with time.

It was found for both unfluorinated and fluorinated rubber that the plot of logarithm of stress against time is a straight line whose slope is a measure of ozone resistance, as more fully disclosed in the article referred to above. In the drawing, this linear relation (hereinafter referred to as rate of stress relaxation) is plotted as one coordinate and the percentage of linear extension or strain as the other. This curve shows the rate of deterioration of both untreated and fluorinated rubber samples at various strains and constant ozone concentrations. The strains tested are within the vicinity of the critical region for ozone attack.

The curves for both untreated and fluorinated rubber disclose that the rate of crack initiation and the rate of crack propagation for fluorinated rubber are significantly lower than the corresponding rates for untreated rubber. The curves also show that the maximum deterioration rate for fluorinated rubber occurs at about 15% strain, in contrast to the 10% maximum deterioration rate for untreated rubber; and even more importantly from the standpoint of use, the maximum rate for fluorinated rubber is much less than that for untreated rubber. In other words, the untreated rubber is attacked more rapidly than the fluorinated rubber, and further the untreated rubber exhibits the maximum rate of deterioration.

It is now readily obvious that the fluorine treatment of rubber unquestionably increases the resistance of rubber to ozone attack. While the exact manner in which the treatment serves is not fully understood, the following explanation is advanced. In the case of natural rubber, it is believed that the surface double bonds of rubber are eliminated by the superficial chemical reaction of fluorine and rubber, as expressed by the following equation:

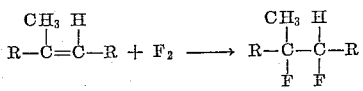

The points of ozone attack are thus eliminated from the surface without chain scission to produce a rubber article which is resistant to ozone or any other oxidizing agent. At the same time, the physical properties which are not surface-dependent are virtually unchanged, since the greater mass of rubber does not react with fluorine.

The superficial fluorination of this process can be readily and effectively applied to a wide variety of rubber and rubber-like materials to render them resistant to ozone and other deleterious substances. In this way, not only is the useful life of these materials prolonged, but there is available a wider choice of materials for specific applications where susceptibility to ozone attack has forced the use of materials less desirable in other respects. Gaskets and fluid conduits made of rubber and treated in accordance with the process of the instant invention, for example, not only enjoy a longer useful life, but they may be stored for an indefinite period of time and still be serviceable when needed. Still another important commercial application of the present invention is in the manufacture of breathing equipment, particularly face masks which are adapted to be placed against and conform to the facial features of the wearer. A representative mask of such type is fully disclosed and claimed in U.S. Patent No. 2,917,045, C. E. Schildknecht et al., issued December 15, 1959. The mask is preferably made of rubber, either natural or synthetic, and is capable of withstanding steam sterilization without damaging effects. In accordance with the process of the present invention, the rubber material of the mask may, for example, be stressed to produce an elongation of at least 20% and treated with a gaseous mixture containing about 20% fluorine, for a period in excess of one hour. The amount of fluorine added to the surface area of the rubber mask is in the order of 2 milligrams of fluorine per square inch of surface area. The treated face mask is characterized by its resistance to ozone and other deleterious substances; it affords the desired pliability since treatment with fluorine does not adversely affect such property; and the treated mask may be stored for a long period of time and still be readily serviceable when needed.

Fluorinations may be carried out with inert gases such as argon, helium, nitrogen, and carbon dioxide. And it may be advisable to employ fluorinating agents other than gaseous fluorine, depending upon economic considerations and specific operating procedures. Moreover, as indicated in the examples above, for purposes of obtaining the desired results, the rubber sample should be fluorinated while it is subjected to a stress which is at least equal to or greater than the stress of the fluorine-treated article during exposure to ozone.

In order to determine the amount of fluorine absorbed on the surface of an article treated in accordance with the process of the invention, Sample No. 10 was weighed both before and after treatment with fluorine. The difference in the two weights is obviously the weight of fluorine absorbed by the rubber sample during treatment. Since the surface area of the rubber sample can be measured, the amount of fluorine added per unit of surface area may be readily computed. In Sample No. 10, this ratio amounted to about 2 milligrams per square inch of surface area. It was noted that the thin layer on top of the sample was heavily fluorinated, but that the extent of fluorination decreased sharply with increasing penetration into the body of the sample.

It is evident that utilization of the present invention makes possible the production of an improved rubber product for a wide variety of uses in the rubber industry. The equipment is very simple, the conditions required in the process are not extreme, and the process is rapid and efficient.

It is to be understood that the invention is not limited to the specific examples described above but may be practiced in other ways without departing from the spirit and scope of the invention as defined by the following claims.

We claim:
1. A process for rendering the surface of an article made of natural rubber resistant to ozone comprising exposing the surface to be treated of said article to a dilute fluorine containing atmosphere containing at least 20% by volume fluorine and a nonreactive gaseous diluent, applying stress to said article to stretch said surface while said surface is exposed to said fluorine containing atmosphere and continuing the exposure of said surface to said fluorine containing atmosphere for a sufficient time to fluorinate said surface to a degree rendering said surface resistant to the chemical action of ozone but without affecting substantially the physical characteristics of said article.

2. A process for rendering the surface of an article made of natural rubber resistant to ozone in accordance with claim 1, wherein said surface is stretched to at least 20% elongation.

3. A process for rendering the surface of an article made of natural rubber resistant to ozone in accordance with claim 1, wherein said treated surface contains in the order of 2 milligrams or more of fluorine per square inch.

4. A face mask comprising a hollow body defining a breathing chamber and a flexible hollow rim forming a face-contacting portion of said body, said mask body and rim being made of natural rubber, said mask having exposed surface areas fluorinated by exposing said surface areas, while stressed to stretch said surface areas, to an atmosphere containing at least 20% by volume of fluorine and a nonreactive diluent gas for a time sufficient to render said areas resistant to the chemical attack of ozone but without substantially altering the physical characteristics of said natural rubber.

References Cited by the Examiner

UNITED STATES PATENTS

| | | | |
|---|---|---|---|
| 1,532,234 | 4/25 | Dennison | 260—772 |
| 2,129,289 | 9/38 | Soll | 260—94.7 |
| 2,917,045 | 12/59 | Schildknecht et al. | 128—146 |

LEON J. BERCOVITZ, *Primary Examiner.*